United States Patent [19]

Ulert

[11] 3,912,035
[45] Oct. 14, 1975

[54] BELT RELAXER

[76] Inventor: Izaak A. Ulert, 3651 Dumbarton, Houston, Tex. 77025

[22] Filed: Feb. 25, 1974

[21] Appl. No.: 445,227

Related U.S. Application Data

[63] Continuation-in-part of Ser. No. 364,642, May 29, 1973, abandoned.

[52] U.S. Cl. .......................... 180/82 C; 280/150 SB
[51] Int. Cl.² .......................................... B60R 21/10
[58] Field of Search ....................... 180/82 R, 82 C; 280/150 SB; 296/65 A; 297/388, 389

[56] References Cited
UNITED STATES PATENTS

| | | | |
|---|---|---|---|
| 3,436,094 | 4/1969 | McKeon | 280/150 SB |
| 3,743,046 | 7/1973 | Rothschild | 180/82 C |
| 3,748,640 | 7/1973 | Sardo, Jr. | 180/82 C X |
| 3,794,135 | 2/1974 | Ewert et al. | 180/82 C |

*Primary Examiner*—M. Henson Wood, Jr.
*Assistant Examiner*—Michael Mar
*Attorney, Agent, or Firm*—James F. Weiler; William A. Stout; Dudley R. Dobie, Jr.

[57] ABSTRACT

A belt relaxer for relaxing a seat belt or shoulder belt including a sensor in a seat, gear means which drive the belt reel in a direction to relax the belt, and linkage activating the gear means a predetermined distance in response to a signal from the sensor when an occupant of the seat applies pressure against the sensor, such as the back of the occupant resting or being supported by the back rest of the seat. The gear means is arranged so that upon release of pressure on the sensor and pushing the belt, or just release of pressure on the sensor, the gear means returns to initial position. The linkage is mechanical, electrical, pneumatic or hydraulic or combinations thereof. The sensor may include a time delay to avoid actuating the gear means upon momentary release and reapplication of pressure to the sensor. A number of embodiments are disclosed.

30 Claims, 25 Drawing Figures

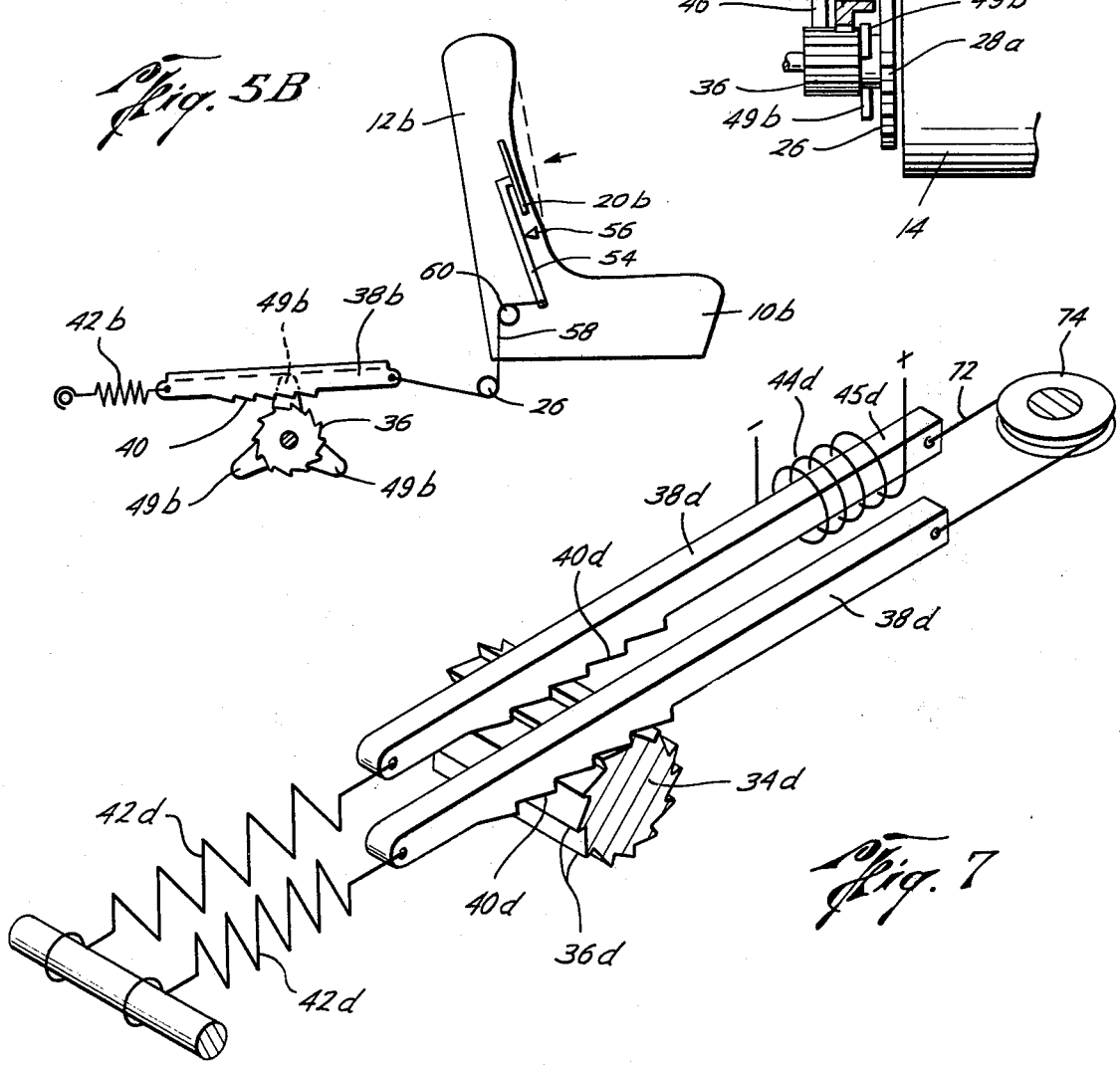

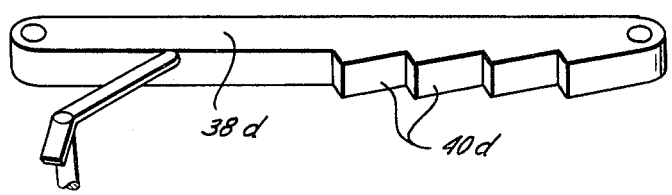
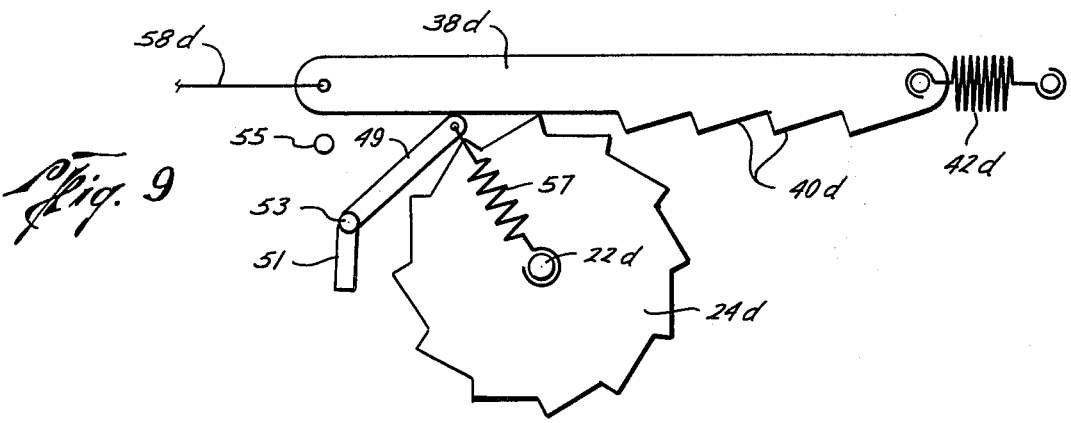
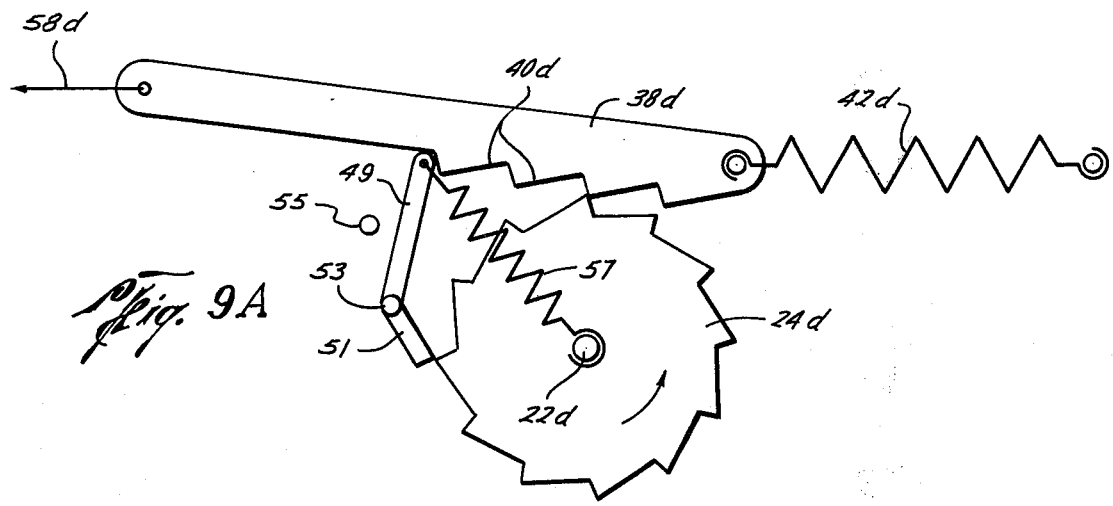
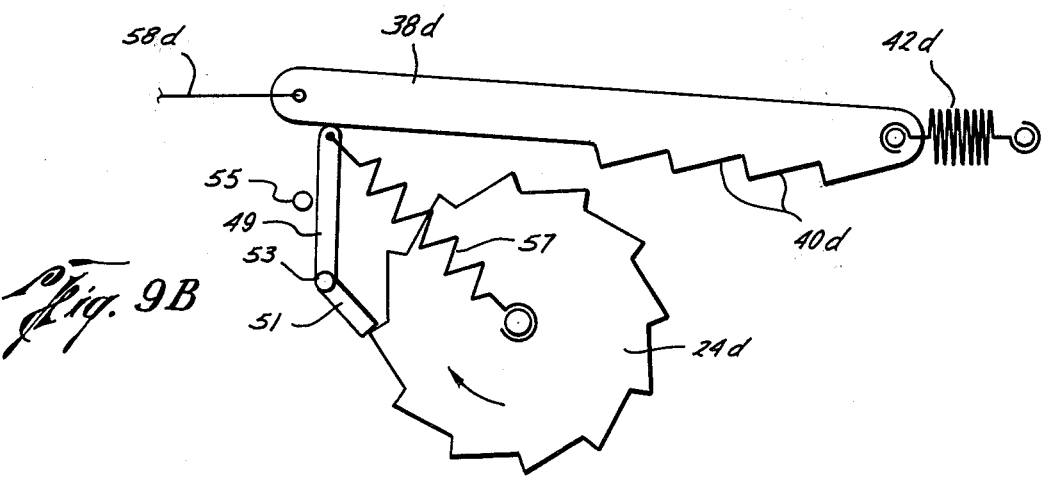

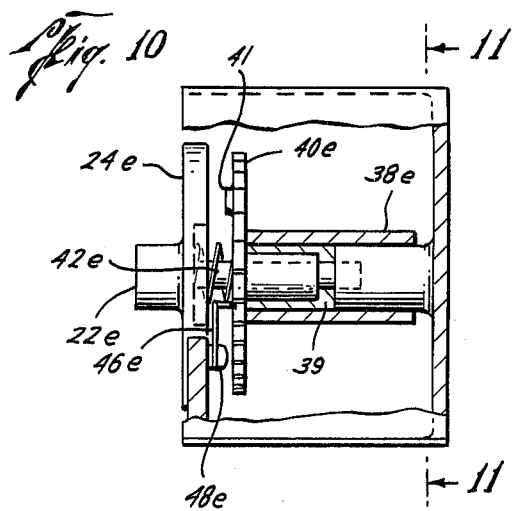
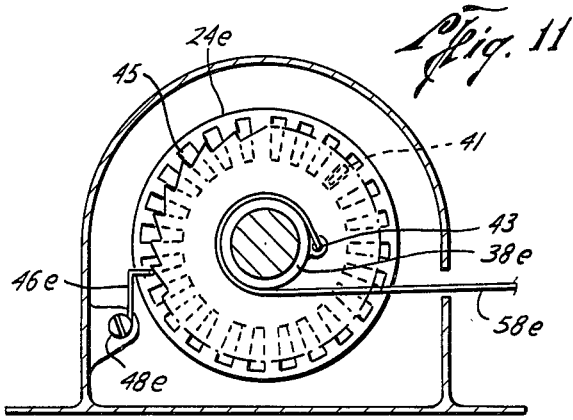
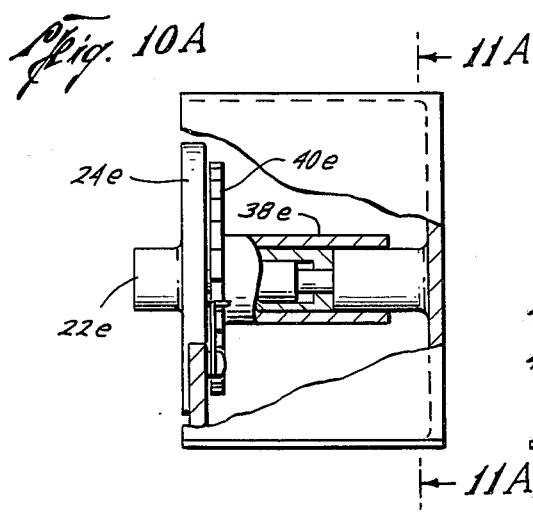
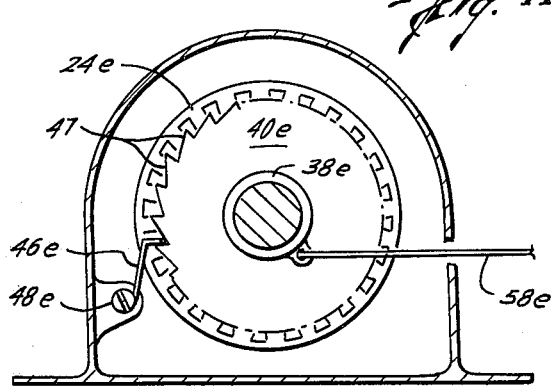
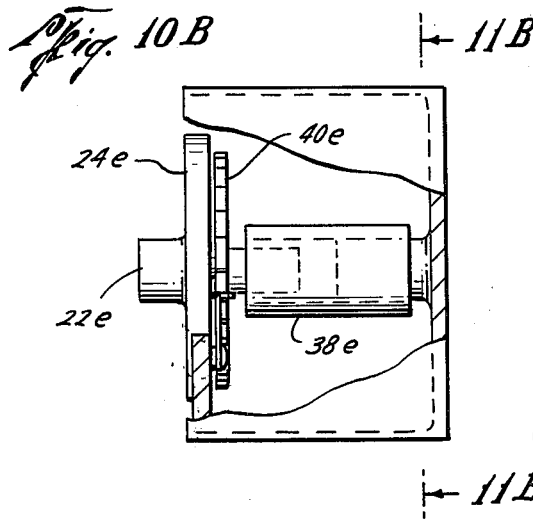
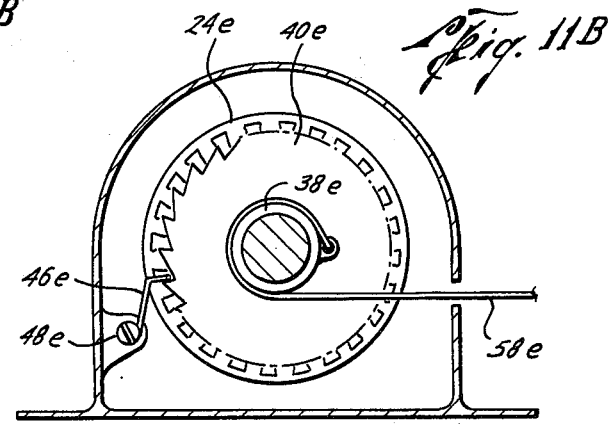

BELT RELAXER

REFERENCE TO RELATED APPLICATION

The present application is a continuation-in-part of application Ser. No. 364,642 filed May 29, 1973, now abandoned.

BACKGROUND OF THE INVENTION

While the use of seat belts and shoulder belts in automobiles has advantages, such belts are uncomfortable to the user in that they are spring-biased and tend to bind the user and wrinkle clothes. They do not provide a slightly loose, but effective, wrinkle-free fit for the user. This is particularly so when the user is a woman.

The present invention is directed to a belt relaxer which relaxes a seat belt or a shoulder belt sufficiently to be comfortable and not to wrinkle the clothes of the user, but yet does not interfere with the normal function of the seat belt or shoulder belt.

The inventor is not aware of any prior patents, publications, or uses disclosing or suggesting such a belt relaxer.

SUMMARY

The present invention relates to a belt relaxer for relaxing a seat belt or shoulder belt thereby providing a comfortable, substantially wrinkle-free fit for the user without interfering with the normal function of the seat belt or shoulder belt.

Accordingly, it is an object of the present invention to provide a belt relaxer for relaxing a seat belt or shoulder belt which provides a comfortable, wrinkle-free fit of the belt to the user and yet does not interfere with the normal function of the belt.

A further object of the present invention is to provide a belt relaxer for relaxing a seat belt or shoulder belt which includes a sensor in the back rest of the seat, gear means which drive the belt reel to play out and thereby relax the belt, and linkage activating the gear means a predetermined distance in response to a signal from the sensor when an occupant rests against the back rest.

A further object of the present invention is the provision of such a belt relaxer which includes a time-delay mechanism so that minor movements of the occupant to and away from the back rest will not actuate the gear means.

A further object of the present invention is the provision of such a belt relaxer which is relatively simple and inexpensive, which may readily and easily be installed in a portion of a seat of an automobile, such as the back rest, but yet is effective to relax the belt to provide a comfortable and substantiall wrinkle-free fit without interfering with the normal function of the belt.

Other and further objects, features and advantages of the invention will be apparent from the following brief description of the drawings and of the presently preferred embodiments of the invention.

BRIEF DESCRIPTION OF THE VIEWS OF THE DRAWINGS

FIG. 2A illustrates a detail of a detent for centering a gear in position and taken along the line 2A—2A of FIG. 2, FIG. 5A is a sectional view taken along the line 5A—5A of FIG. 5, FIG. 5B is a view similar to that of FIG. 5 but illustrates the gears in disengaged position, FIG. 7 is an enlarged, perspective view illustrating another embodiment of the gear means, and FIG. 8 is a perspective view of a drive bar of a simplified form of belt relaxer, FIG. 9 is a side view of the simplified form of belt relaxer using the drive bar of FIG. 8 shown in initial position, FIG. 9A is a view similar to FIG. 9 illustrating the position of the gear means after actuation and driving the belt reel in a direction which relaxes the seat belt, FIG. 9B is a view similar to those of FIGS. 9 and 9A but illustrates the gears in disengaged position, FIG. 10 is a side view, partly in section, illustrating a still further form of seat belt relaxer in initial position, FIG. 10A is a view similar to that of FIG. 10 illustrating the gears in engaged position and after driving the seat belt to a relaxed position, FIG. 10B is a view similar to those of FIGS. 10 and 10A illustrating the gears in a position to become disengaged, FIG. 11 is a view taken along the line 11—11 of FIG. 10, FIG. 11A is a view taken along the line 11A—11A of FIG. 10A, FIG. 11B is a view taken along the line 11B—11B of FIG. 10B.

DESCRIPTION OF THE PREFERRED EMBODIMENTS

Figure 1:
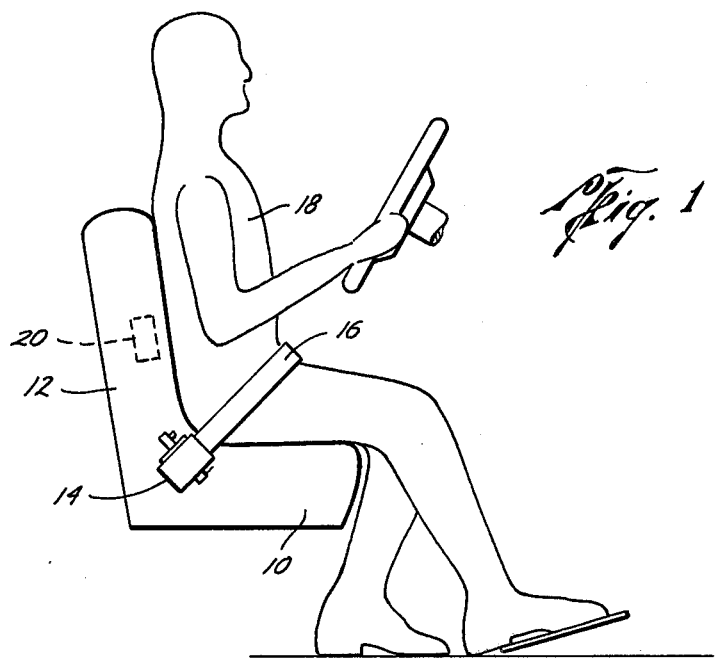
FIG. 1 is a schematic, side-elevational view of an occupant sitting in a car seat having a seat belt which has a belt relaxer according to the present invention.

Referring now to the drawings, and particularly to FIG. 1, an automobile seat 10 having the back rest portion 12, belt reel 14 and seat belt 16 disposed about an occupant 18, here shown as the driver of the automobile, is illustrated. The belt reel 14 and seat belt 16 are conventional except that the belt reel is actuated and driven in a direction which plays out and relaxes the belt 16 a predetermined distance to provide comfort and to avoid wrinkling the clothes of the user, such as the occupant 18. A sensor, here illustrated diagrammatically by the dotted lines 20, is disposed within the back rest portion 12 of the seat 10 so that when the back of the occupant 18 rests against or is supported by the back rest portion 12 the sensor 20 is actuated as hereinafter described.

Figure 2:
FIG. 2 is an enlarged side view of gear means and electromagnetic means for driving the belt reel for relaxing the belt, and shown in initial position.

Referring now to FIG. 2 the belt 16 is wound into the reel 14 and about the rotatable shaft 22. This arrangement is conventional and, while not shown, the reel 14 normally includes spring means to pull the belt 16 tightly across the user, that is, reels it in under pressure, which causes discomfort to and tends to wrinkle the clothes of the user.

In order to relax the belt 16, that is drive the shaft 22 in a direction a short distance which will relax the belt 16, suitable gear means are provided, here shown as a gear member 24 secured about an extension of the shaft 22 and a driving gear member 26 having the spaced gear segments 28a, 28b and 28c separated by the non-gear segments or blanks 30a, 30b and 30c. The gear member 26 is rotatably connected to the casing of the reel 14 by means of the shaft 32 to which also is secured a gear 34 provided with ratchet-type gear teeth 36.

In order to yieldably maintain the gear 26 centered in the position illustrated in FIG. 2, circumferential groove segments 31a, 31b and 31c are provided inwardly of the blank gear segments 30a, 30b and 30c and the detents 33a, 33b and 33c (only 33c being shown) are disposed to engage their respective grooves at their deepest parts, as best seen in FIG. 2A, which yieldably maintains the gear 26 centered. If desired, only one detent may be used in a convenient position centering whichever groove 31a, b, c which comes into contact with it.

With further reference to FIG. 2A, the detent 33c includes the ball 35c pressed by the plunger 37c and the spring 39c. The other detents are the same; however, any desired detent means may be utilized to yieldably maintain the gear 26 centered as described.

Figure 3:
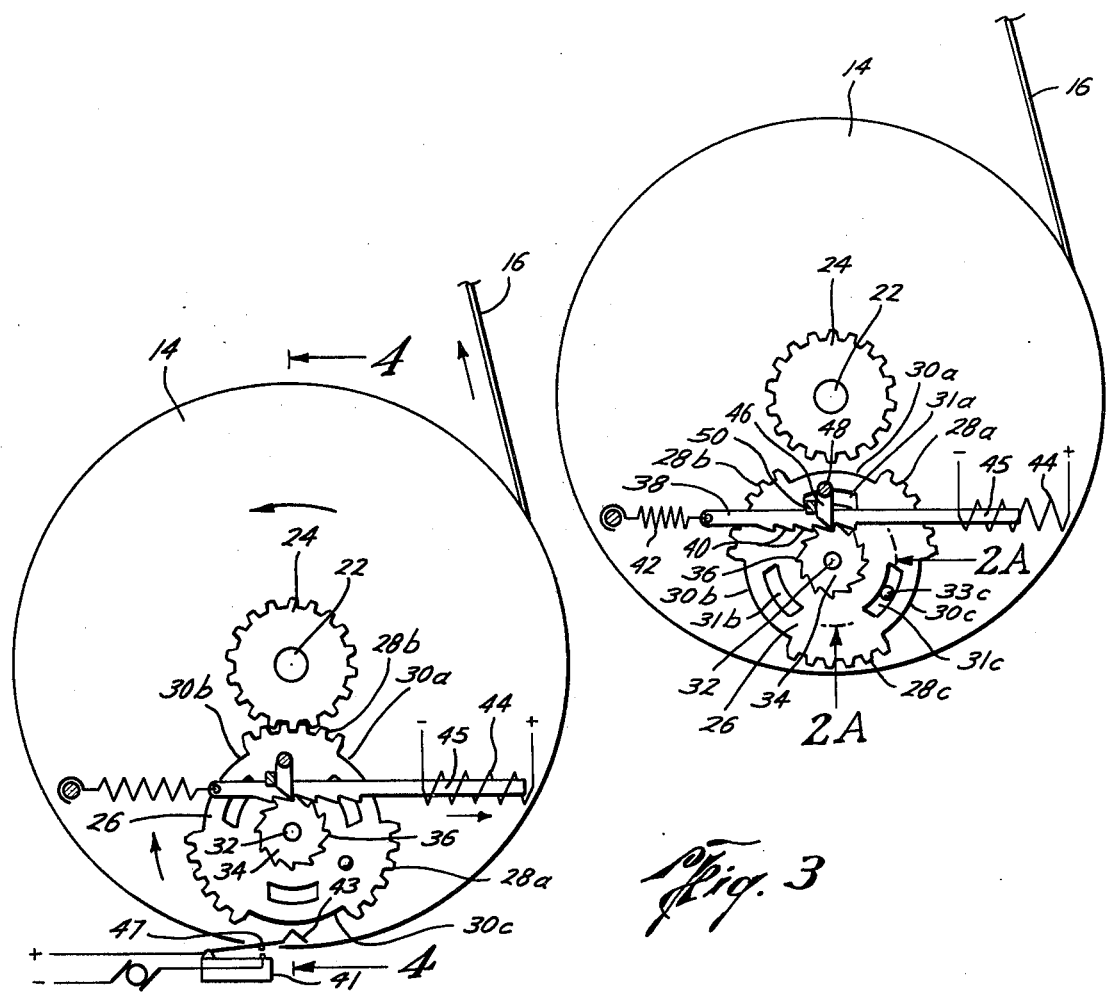
FIG. 3 is a view similar to FIG. 2 but illustrates the position of the gear means after actuation and driving the belt reel in a direction which relaxes the seat belt.

A gear driving member, here shown as a generally linear member 38, is provided which has the ratchet-type teeth 40 which engage the ratchet-type teeth 36 on the gear 34. The gear member 38 is biased by the spring 42 in a direction which tends to move or hold it in initial position, such as shown in FIG. 2, and, at its other end, has an electromagnet, here illustrated as the electric coil 44 wound about a magnet portion 45, so that upon application of electric current to the coil 44 the right end, as the drawing is viewed, of the gear member 38 is moved to the right thereby driving the gear 26 in the direction of the arrow, as best seen in FIG. 3, which in turn causes the gear segment 28b to engage and rotate the gear 24 and hence the reel shaft 22 in the direction of the arrow which plays out the belt 16 a short distance thereby relaxing the belt. Any desired electromagnet may be used, such as a Lucas solenoid No. 76553B, 12 volt, and no further description thereof is given or deemed necessary.

Figure 4:
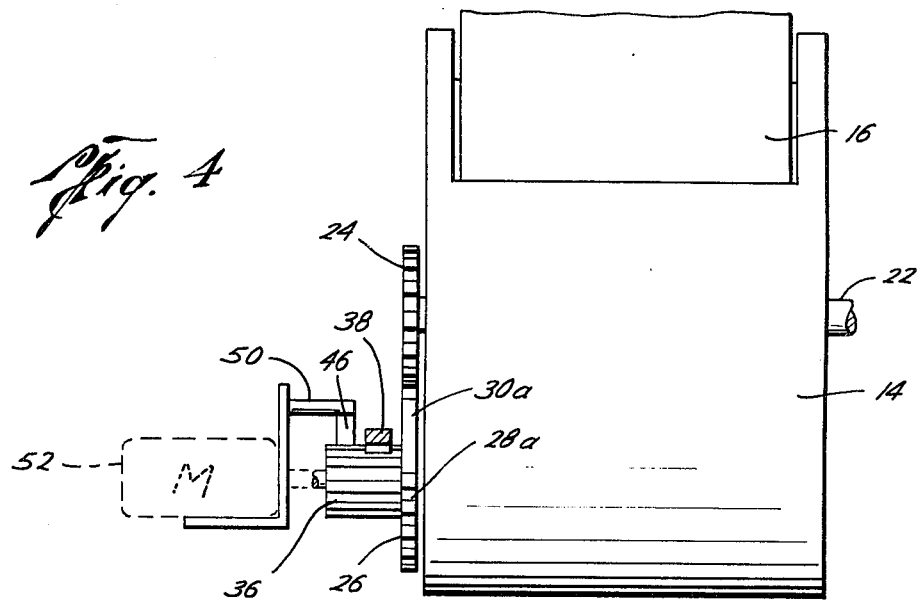
FIG. 4 is a cross-sectional view taken along the line 4—4 of FIG. 3 and also illustrates in dotted lines an electric motor for actuating the gear arrangement.

A stop member, such as the pawl 46, is pivotally secured by the pivot pin 48 to a suitable structural member, such as the reel casing as shown in FIG. 4, and may pivot in a direction to the right only, as the drawing is viewed, in view of its engagement with the abutment member 50. Thus, stop member 46 is free to pivot in the forward or right-hand direction of movement of the gear member 34, but is fixed against movement in a left-hand or backward movement. As illustrated in FIG. 3, the teeth 36 on the gear 34 and the teeth 40 on the gear segment or rod 38 are ratchet-type teeth and are slanted in a direction so that as the gear member 38 moves forwardly or in a right-hand direction, the pawl 46 pivots upwardly and to the right to permit this forward movement of the gear 34 which is being driven by the gear member 38 so that the parts move to the position as illustrated in FIG. 3. When this movement is completed the pawl 46 prevents reverse movement of the gear 34 and maintains the gears in the position illustrated in FIG. 3 thus holding the reel 14 in a position with the belt 16 played out or relaxed.

When current is no longer provided to the coil 44, the spring 42 pulls the gear member 38 in a reverse direction, that is to the left as the drawing is viewed, which is permitted due to the fact that gear member 38 moves up slightly permitting the gear member 38 to return to the position illustrated in FIG. 2 in response to the bias of the spring 42. Any pressure of the body against the relaxed belt will move the reel 14 and consequently the gear 24 so that the gear 26 will move forward causing the blank spaces 30a, 30b, 30c to move into the position as illustrated in FIG. 2, the initial position.

In order to make the belt relaxer inoperative when in the operated (belt relaxed position of FIG. 3 in response to release of pressure so that further momentary activated of the sensor 20 will not result in moving the device into the original position, a current interrupting device or switch 41 is provided which includes the spring arm 43 normally biasing the electric contacts 47 in open position when the gears are in the position illustrated in FIG. 3 which interrupts the current to the electromagnet 44, 45 so that actuation of the sensor 20 produces no movement. When the relaxed belt 16 is pushed causing the gear 26 to assume the position in FIG. 2, the spring of arm 43 is depressed by the engaging gear segment 28a, 28b or 28c, as the case may be (not shown) which closes the electrical contacts 47 thus closing the circuit to the sensor 20. Activation of the sensor 20 then causes the belt relaxer to relax the belt 16 as previously described.

FIG. 4 illustrates a modification in that the electric motor 52, illustrated in dotted lines, is utilized to drive the gear 26 rather than the gear arrangement and electormagnet previously described. The motor 52 is actuated by the sensor 20 as previously described and all other parts and the mode of operation including current interruption to the sensor 20 are the same as that of FIGS. 2 and 3. Any suitable motor may be used to drive the gear 26 an incremental distance, many of which motors are available on the commercial market, for example, a modified Volvo Motor No. 688400. Accordingly, no detailed description thereof is given or deemed necessary.

Figure 5:
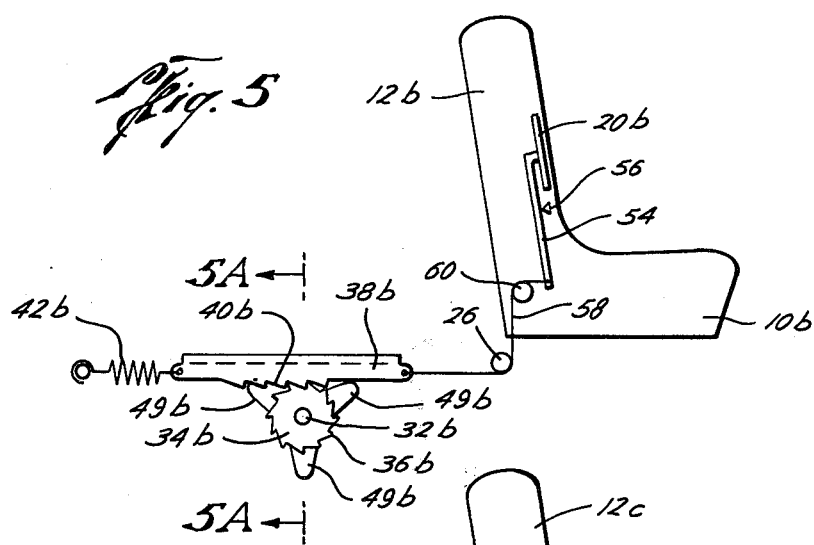
FIG. 5 is a schematic side-elevational view illustrating a mechanical arrangement for actuating the gear means for relaxing the belt.

Referring now to FIG. 5, a mechanical arrangement is illustrated for actuating the gears, in which the reference letter b has been added to numerals designating like parts in FIGS. 1–4. The arrangement illustrated here is a mechanical one in which the sensor 20 b in the back rest portion 12b of the seat 10b actuates a pivot arm 54 pivoted about the pivot 56, a flexible member, such as a cord 58 being connected to the lower free end of the pivot arm 54, through the pulleys 60 and 62 and connected to the gear member 38b. Thus, when pressure is applied against the sensor 20b, it moves inwardly or backwardly of the back rest portion 12b of the seat 10b thus causing the pivot arm 54 to pivot about the pivot 56 causing the lower end of the pivot arm 54 to move forwardly thus drawing the cord 58 in a forward direction and in turn moving the gear member 38b forwardly, to the right as the drawing is viewed, which in turn drives the gear 34b, as illustrated in FIG. 5B. While not shown in these views, the gear 34b, of course, drives the gear arrangement illustrated in FIGS. 2–4 thus playing out a portion of the seat belt 16b. Upon release of pressure from the sensor 20b the spring 42b at the other end of the gear member 38b is free to move the gear member 36b in a rearward position to the left as the drawing is viewed. In order to permit the gear member 38b to return to initial position, the ratchet teeth 36b and 40b must be disengaged. For this purpose the circumferentially spaced projections 59b are provided so that when the gear member 38b moves into position as illustrated in FIG. 5B, the gear member 38b is engaged and lifted by one of the projections 49b thus disengaging the ratchet teeth 36b and 50b as illustrated in FIG. 5B. The roof-like offset 80 on the gear member 38b which is engaged by projection 49b is shown on FIG. 5A.

Figure 6:
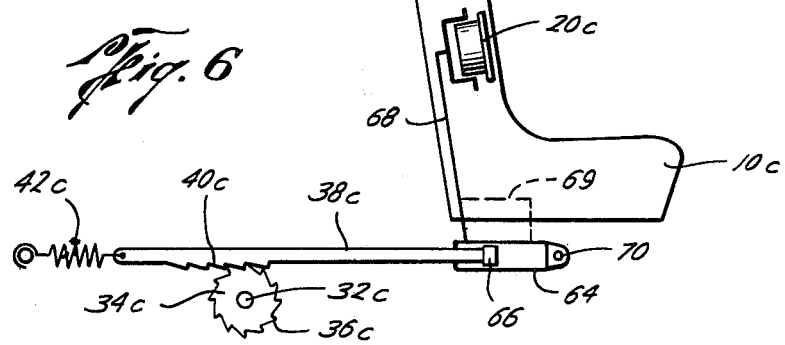
FIG. 6 is a view similar to that of FIG. 5 but illustrates schematically a hydraulic, pneumatic or negative pressure system for actuating the gear means for relaxing the belt.
Figure 12:
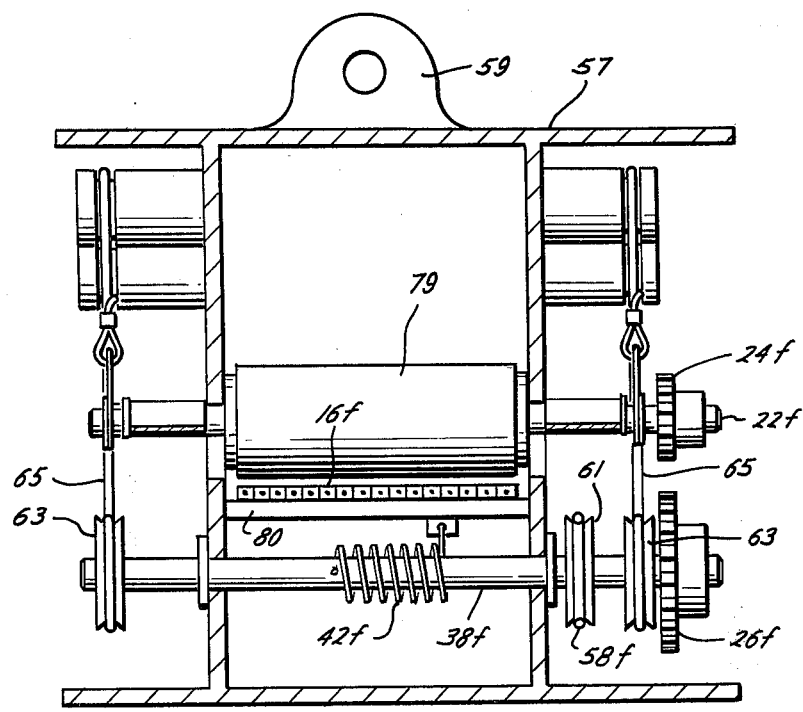
FIG. 12 is a front sectional view of an "add-on" belt relaxer shown in initial position.
Figure 12A:
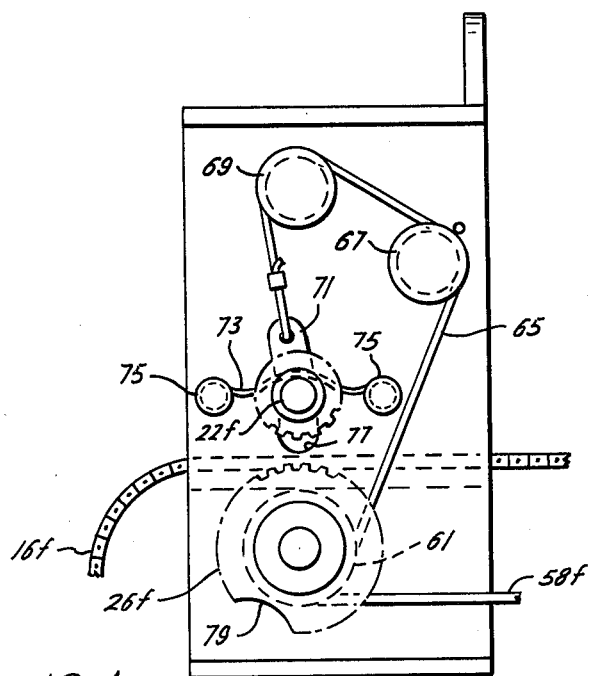
FIG. 12A is a side view of FIG. 12.

Referring now to FIG. 6, a pressure fluid linkage for actuating the gear means is illustrated in which the reference letter c has been applied to reference numerals designating like parts in FIGS. 1–5. In this embodiment a cylinder 64 is provided into which is disposed a piston 66 secured to the forward portion, right-hand side, of the gear member 36c. Pressure is applied to the cylinder 64 by means of the line 68 which is provided in response to inward or backward movement of the sensor 20c from a suitable pressure source, not shown. Thus, when the sensor 20c is moved inwardly or backwardly, pressure, such as hydraulic pressure, is applied into the cylinder 64 which moves the piston 66 forwardly or to the right, which in turn provides a corresponding movement to the gear member 38c which actuates and drives the gear means, all as previously described. Similarly, when pressure is released from the sensor 20c, the pressure of the hydraulic fluid is released from the cylinder 64 and in the line 68 to a suitable reservoir source, such as contained in the sensor 20c, and the spring 42c pulls the gear member 38c backwardly or in a left-hand direction. The gear member 38c is provided with suitable pivot means, here shown as the pivot 70, to permit it to move upwardly so that the ratchet teeth 36c and 40c may be disengaged to permit this movement. Any suitable pivot arrangement or linkage may be used.

If desired, the pressure may be pneumatic rather than hydraulic to move the piston 66 in the cylinder 64, or a negative pressure may be utilized such as a vacuum system, in which event the line 68 is connected to a suitable vacuum source in the automobile, or as created by bellow type pressure plate in the sensor 20c, neither of which is shown, and is connected into the cylinder 64 as illustrated in the dotten lines 69 in FIG. 6. Thus, when the sensor 20c is depressed, vacuum is applied through the lines 68 and 69 into the cylinder 64 which draws the piston 66 rather than pushing it as described in connection with the hydraulic or pneumatic system of FIG. 6. Any desired vacuum means may be used, for example, a Volvo vacuum bellows No. 684817. Accordingly, no detailed description thereof is deemed necessary or given. All other parts and the mode of operation of this embodiment are the saem as previously described and no further description thereof is given.

Thus the pressure utilized to actuate the piston 66 in the cylinder 62 may be positive or negative (vacuum), hydraulic or pneumatic. Accordingly, the term "pressure" as used herein includes both positive and negative (vacuum) pressure.

No more detailed description is given of the modification of FIGS. 5 and 6, as well as the modification illustrated in the dotted lines in FIG. 4, as well as the source for the pressure and other details of these systems have been omitted for simplification of the disclosure since the various elements an components for these systems are conventional and readily available on the market.

If desired, or needed, to have the belt relaxer assume the original off position illustrated in FIG. 2 any time contact with the sensor 20 is interrupted and without waiting for a push on the belt 16 to revert the belt relaxer to its original or initial position, such an embodiment of the invention is illustrated in FIG. 7, to which reference is now made, and in which the reference letter d is applied to numerals designating corresponding parts in the preceding figures. As shown in FIG. 7, a pair of gear members 38d, which are generally linear bars having the ratchet teeth 40d, are connected by the line 27 and pulley 74 so that they move in opposite directions. The spring 42d connected to the first gear member 38d, which has the electromagnet 44d, 45d, is stronger than the other spring 42d connected to the second gear or slave member 38d. Thus when electric current is interrupted to the coil 44d, the stronger spring 42d pulls the first gear member 38d to the left and the slave gear member 38d to the right which rotates the gear 34d to bring the various gear members into the position illustrated in FIG. 2. When the electromagnet 44d, 45d is again activated, the weaker spring assists in moving the slave gear member 38d to the left while the first gear member 38d is driving the gear 34d into the position illustrated in FIG. 3. The ratchet teeth 36d and 40d on the gear 34d and gear member 38d permit this movement.

While the embodiment of FIG. 7 has been illustrated for convenience in connection with an electromagnet form of the belt relaxer, this embodiment may be utilized with all the embodiments to which it may be applicable.

No detailed description is given of the sensor of FIG. 1 since any desired sensor may be used and preferably one which has a time-delay mechanism, such sensors being readily available on the open market.

While the gear means has been illustrated as driving the shaft 22 of the belt reel 14, the gear means may drive the reel 14 by placing suitable gear means on the reel.

A simplified form of belt relaxer is illustrated in FIGS. 8, 9, 9A and 9B, to which reference is now made and in which the reference letter "d" has been added to numbers designating corresponding parts of the preceding figures. In this embodiment, the driven or first gear 24d, driven by the drive or second gear 40d on the linear drive bar 38b, is connected directly to the axle 22d of the belt reel, not shown. Thus, the gear means in this embodiment comprises the generally linear shaft 38d having the gear segment 40d on it which drives the gear 24d which, in turn, drives the belt reel for playing out the seat belt. Thus, a force is applied by the leader 58d in response to actuation of the sensor, not shown, the linear shaft 38d moves to the left against the tension of the spring 42d which causes the gear segment 40d to engage and drive the gear 24d to rotate the shaft 22d which plays out the seat belt, not shown.

As a convenience feature, which may be omitted, a device is provided which permits the passenger to move within the area of the relaxed belt without having the belt relax and return when activating or de-activating the sensor, which includes the stop arms 49 and 51 secured by the pivot 53 and restrained in its movement by the stop 55. The spring 57 yielding holds the stop arms 49 and 51 in the position illustrated in FIG. 9. As the linear shaft or drive arm 38d is moved to the left as illustrated in FIG. 9A, the lead tooth of the gear segment 40d engages the upper end of the stop arm 49 moving it to the position where the stop arm 51 moves into an engages a geat tooth of the gear 24 ultimately moving to the position illustrated in FIG. 9B so that further movement of the gear 24d is prevented by the stop arm 49 engaging the stop 55. This prevents any further rotation of the driven wheel 24d and, at the same time raises the linear shaft or drive arm 38d so that upon release of the sensor, the gear reel 24d may return to the initial position as illustrated in FIG. 9. Thus, the farther activation or de-activation of the sensor has no effect on the gear 24d until the passenger moves the belt beyond the relaxation point by pushing against it. When this happens, the gear 24d is rotated by the shaft 22d (which turns with the belt reel) in a counterclockwise direction thereby releasing the arm 51. The spring 57 then is free to pull the arm 49 down allowing the bar 38d to move down and reestablish the initial position as illustrated in FIG. 9 (all this time the body of the passenger being pushed against the belt is away from the sensor situated in the back of the seat). This modality allows the passenger to move within the area of the relaxed belt without having the belt relax and return when activating or de-activating the sensor.

The other parts and means of actuating this embodiment of the belt relaxer are the same as previously described and no more description thereof is deemed necessary or given.

A further simplified form of the belt relaxer is illustrated in FIGS. 10, 10A, 10B, 11, 11A and 11B to which reference is now made and to which the reference letter "e" has been added to reference numerals designating corresponding parts of those in the preceding figures.

In this embodiment the first or driven gear 24e is secured to the axle 22e of the seat belt reel, not shown, and the second or driving gear 40e including the gear projection 41 which is normally held out of engagement with the driven gear 24e by means of the coil spring 42e. The second gear means includes the internally threaded nut 38e which is received into the externally threaded bolt 39 so that upon rotation of the nut 38e it is moved to the right and to the left thereby causing the gear 40e and its gear projection 41 to be correspondingly moved. Leader 58e which is actuated by the sensor, not shown in these views, is connected to the internally threaded nut 38e at the projection 43. Thus, and as best seen in FIGS. 11, 11A and 11B, as the leader is moved in a direction to the right, the nut 38e is rotated which causes it to move to the left and, in turn, rotate and move the gear 40e and gear projection 41 to the left to engage the gear 24e with the gear projection or lug 41 interfitting into one of the gear slots 45 which thereby causes rotation of the gear 24e which, in turn, rotates the axle or shaft 22e of the belt reel thereby playing out or relaxing the belt a desired distance. When the sensor is deactivated, the spring 42e pushes the gear 40e to the right causing it to rotate and move to the right and to disengage the gear projection 41 from the gear slots 45 and the various parts again to assume the position illustrated in FIG. 11.

An optional convenience feature is provided in this embodiment to permit the passenger to move within the confines of the relaxed belt without having the belt relax and return when activating and de-activating the sensor. This takes the form of a spring-like stop member 46e secured to the body of the belt relaxer by the nut 48e, the spring stop 46e having the end portion which fits into the ratchet teeth 47 on the gear 40e. When the sensor is deactivated, the gear 40e stays in the position illustrated in FIG. 10a, and the passenger can move within the confines of the relaxed belt. The spring stop member 46e is disengaged from the ratchet teeth 47 on the gear 40e when the passenger pushes on the belt beyond the relaxed area disengaging the spring 46e and allowing the spring 42e to push the gear 40e backwards away from the spring 46e.

All other parts and operation are the same as described in connection with the preceding figures and, accordingly, no further description thereof is deemed necessary or given.

The belt relaxer can also be an after-market addition to an automobile, that is, applied to the automobile after manufacture. The sensor 20, in this case, is clipped to the back portion 12 of the seat 10, and the gear means attached to the axle or other portion of the belt reel 14, such as by welding, bolting and the like. Thus, actuation of the sensor causes the linkage to actuate the gear means in the manner described.

An embodiment of an after-market addition is illustrated in FIGS. 12, 12A, 13, 13A and 13B, to which reference is now made, and to which the reference letter "f" has been added to numerals corresponding to numerals designating like parts in the preceding figures. This after-market addition includes the body 57 with an upwardly projecting hanger 59, which body 57 carries the driving shaft 38f to which is secured the driving gear 26f, which is normally maintained out of engagement with the driven gear 24f attached to the driven shaft 22f. The torsion spring 42f normally maintains the parts in the positions illustrated in FIGS. 12 and 12A. The leader 58f to the sensor, not shown, is secured about the wheel 61 which is secured to the driving shaft 38f so that as the leader 58f is moved in response to actuation of the sensor, the driving shaft 38f is rotated in a counterclockwise direction against the torsion of the coil spring 42f.

Figure 13:
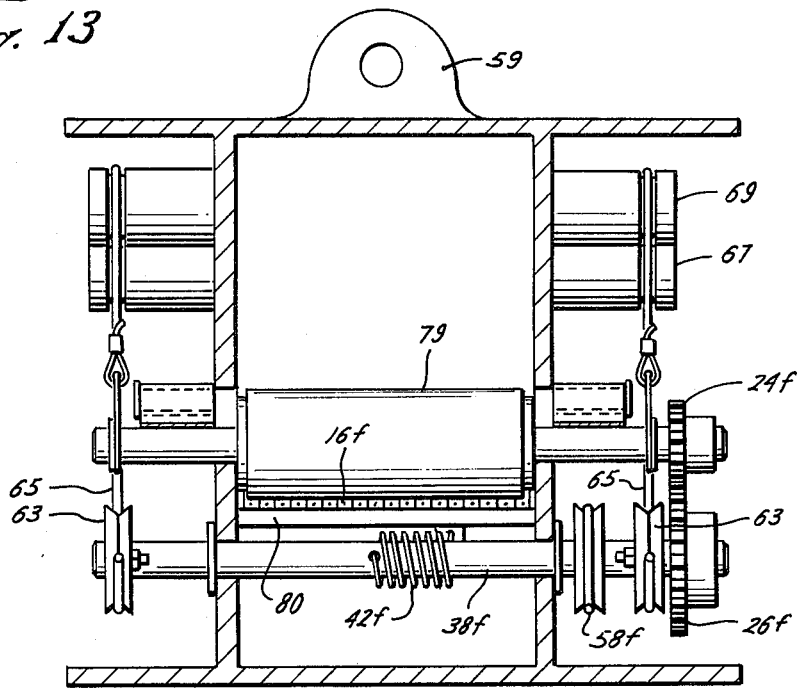
FIG. 13 is a view similar to that of FIG. 12 with the parts in position when driving the seat belt to relaxed position.
Figure 13A:
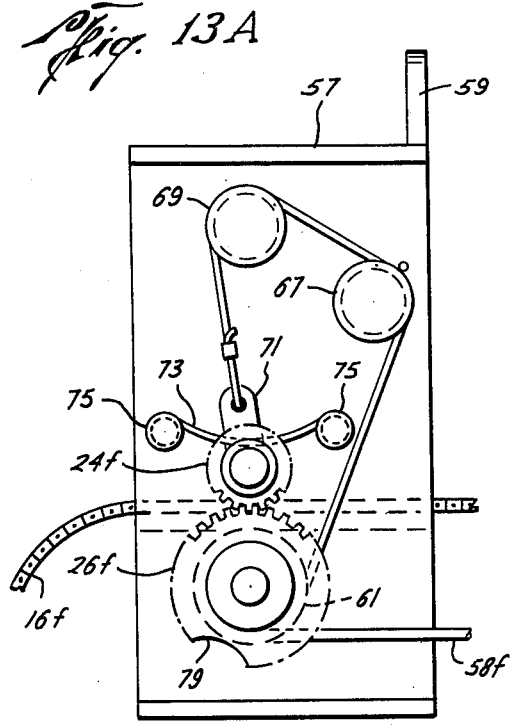
FIG. 13A is a side view of FIG. 13.

Disposed adjacent each end of the drive shaft 38f are the pulleys 63 about which are wound the lanyards 65, which extend over the idlers 67 and 69 and which are secured to the ring members 71, which, in turn, are secured adjacent the ends of the driven axle 22f. The leaf springs 73 secured by the spring pins 75 bear down against the ends of the driven shaft 22f urging it to move downwardly in the slots 77 towards the belt 16f. The torsion spring 42f is stronger than the leaf springs 73 and, normally, the parts are in the position illustrated in FIGS. 12 and 12A, as previously mentioned. When the sensor, not shown, activates and causes a movement of the leader 58f to the right, as viewed in FIG. 12A, the shaft 38f is rotated in an anticlockwise direction which plays out the lanyards 65 thus permitting the springs 73 to move the driven roll 79 on the driven shaft 22f downwardly into engagement with the belt 16f pressing it against the plate 80. This also causes the driving gear 26f to engage the driven gear 24f so that further rotation of the shaft 38f causes the driving gear 26f to rotate in a counterclockwise direction which in turn causes rotation of the driven gear 24f and the driven shaft 22f which rotates the roll 79 thereby causing the belt 16f to be moved and played out, such as illustrated in FIG. 13A.

When pressure on the sensor, not shown, is released, the driving gear 26f is turned in a clockwise direction by virtue of the spring 42f and at the same time the lanyards 65 are wound tighter pulling the driven gear 24f upwardly. The lanyard ring 71 allows the shaft 22f to turn freely and the roll 79 moves away from the plate 77 freeing the belt 16f which retracts to the original position, that is, tightening up against the passenger's body.

Figure 13B:
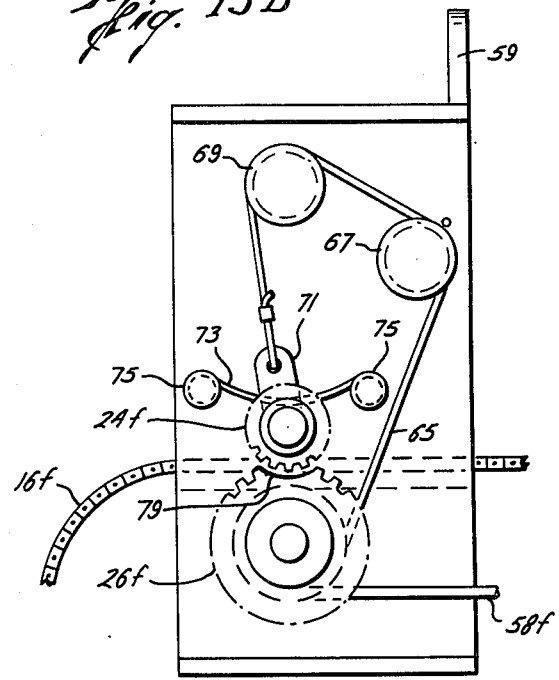
FIG. 13B is a view similar to that of FIG. 13A illustrating the driving gear in a safety position.

A push of the body forward while the belt is relaxed causes the gear 24f to move in a clockwise direction and the gear 26f to move in a counterclockwise direction. This causes the depression 79 in the driving gear 26f to move toward a twelve-o'clock position as illustrated in FIG. 13B, and when the driving gear 26f is in this position, the gear 22f is free to revolve without any further driving action. This also permits the driving gear 26f to move freely at any time the body's pull on the belt is present. If the body is away from the sensor, the driving gear 26f is moved upwardly and the roll 79 releases the belt 16f.

The remaining parts and actuation are the same as previously described and, accordingly, no more detailed description thereof is deemed necessary or given.

Any of the embodiments may be utilized as the aftermarket device and suitable adaptors may be utilized to complete the installation, not described.

The belt may be inserted into the device in any desired manner such as through a slot in the retaining wall on the gearless side and the removal of lanyard from the ring 71.

The present invention, therefore, is well suited and adapted to attain the objects and ends and has the advantages and features mentioned as well as others inherent therein.

While presently-preferred embodiments of the invention have been given for the purpose of disclosure, changes may be made which are within the spirit of the invention as defined by the scope of the appended claims.

What is claimed is:

1. A belt relaxer comprising,
a sensor adapted to be positioned in a back rest portion of a seat,
gear means arranged upon actuation to drive a reel for the belt and to play out a predetermined amount of the belt, and
linkage linking the sensor and the gear means activating the gear means in response to pressure against the sensor.

2. The belt relaxer of claim 1 including,
time-delay means in the sensor delaying for a predetermined time interval actuation of the linkage upon release of pressure against the sensor.

3. The belt relaxer of claim 1 where,
the linkage includes an electric motor arranged to actuate the gear means in response to pressure against the sensor.

4. The belt relaxer of claim 1 where,
the linkage includes an electromagnet arranged to actuate the gear means in response to pressure against the sensor.

5. The belt relaxer of claim 1 where,
the linkage comprises a mechanical linkage arranged to actuate the gear means in response to pressure against the sensor.

6. The belt relaxer of claim 1 where,
the linkage includes a cylinder, a piston movable in the cylinder and means connecting the piston to the gear means for actuation of gear means upon movement of the piston in the cylinder, and
means for applying pressure in the cylinder in response to pressure against the sensor for moving the piston.

7. The belt relaxer of claim 6 where,
the means for applying the pressure to the cylinder comprises pneumatic means.

8. The belt relaxer of claim 6 where,
the means for applying the pressure to the cylinder comprises hydraulic means.

9. The belt relaxer of claim 6 where, the means for applying the pressure to the cylinder comprises negative pressure means.

10. The belt relaxer of claim 1 including,
a stop pawl pivotally carried by the belt relaxer and arranged to engage teeth of the gear means and restrain reverse movement thereof when the gear means have been actuated to drive the reel and play out the predetermined amount of the belt.

11. A belt relaxer comprising,
a sensor adapted to be positioned in a back rest portion of a seat,
gear means arranged upon actuation to drive a reel for the belt and to play out a predetermined amount of the belt,
said gear means including
a first gear arranged to rotate the reel and a second gear driving the first gear, and
linkage linking the sensor and the second gear activating the second year in response to pressure against the sensor.

12. The belt relaxer of claim 11 where,
the second gear has a recessed portion normally out of engagement with the first gear and at least one gear segment arranged to be brought into and out of engagement with the first gear for driving and releasing the first gear, upon the activating of the second gear.

13. The belt relaxer of claim 11 including,
time-delay means in the sensor delaying for a predetermined time interval actuation of the linkage upon release of pressure against the sensor.

14. The belt relaxer of claim 11 where,
the linkage includes an electric motor operable to actuate and drive the second gear.

15. The belt relaxer of claim 11 where,
the linkage includes an electromagnet operable to actuate and drive the second gear.

16. the belt relaxer of claim 11 where,
the gear means also include, a third gear connected to and driving the second gear, a generally linear shaft having a gear segment on it meshing with and driving the third gear, means biasing the shaft in one direction, and the linkage including means for moving the shaft in the other direction in response to the pressure against the sensor.

17. The belt relaxer of claim 16 where, the means for moving the shaft in the other direction comprises electromagnetic means.

18. The belt relaxer of claim 16 where, the means for moving the gear shaft in the other direction comprises mechanical means, said mechanical means including a pivot arm movable into pivoted position upon depressing the sensor, a flexible member secured to the pivot arm and to the linear shaft, and pulleys directing the flexible member so that upon depressing the sensor the arm is pivoted and the flexible member moves the linear shaft in the other direction.

19. The belt relaxer of claim 16 where, the linkage includes a piston and cylinder, the piston connected to and operable to move the shaft in the other direction, and means for applying fluid pressure to the cylinder for moving the piston in response to the pressure against the sensor.

20. The belt relaxer of claim 19 where, the means for applying fluid pressure to the cylinder comprises hydraulic means.

21. The belt relaxer of claim 19 where, the means for applying fluid pressure to the cylinder comprises pneumatic means.

22. The belt relaxer of claim 19 where, the means for applying fluid pressure to the cylinder comprises negative pressure means.

23. The belt relaxer of claim 16 including, a stop pawl pivotally carried by the belt relaxer and arranged to engage teeth of the third gear and restrain reverse movement thereof when the linear shaft has been moved in the other direction and played out the predetermined amount of the belt.

24. The belt relaxer of claim 16 including, means for disengaging the gear segment with the third gear for permitting the linear shaft to return to initial position upon release of pressure against the sensor.

25. The belt relaxer of claim 16 including, a slave linear shaft connected to and driven by the linear shaft in an opposite direction, a second gear sgement on the slave linear shaft meshing with and driving the second gear, both of the gear segments and the third gear having meshing ratchet-type teeth for driving the gear in the other direction thereby relaxing the belt and permitting sliding movement therebetween in the one direction, and means biasing the slave linear shaft in the one direction, but weaker than the means biasing the shaft whereby upon release of pressure from the sensor the linear shaft moves in the one direction to initial position and the slave shaft moves in the opposite direction and rotates the second gear where its recessed portion is out of engagement with the first reel thereby releasing the reel.

26. The belt relaxer of claim 11 where, the second gear comprises a linear gear shaft.

27. The belt relaxer of claim 26 including, stop means arranged to stop rotation of the first gear and to disengage the linear gear shaft from the first gear upon a predetermined limit of travel of the first gear.

28. The belt relaxer of claim 11 where, the second gear is spaced from the first gear, and including an eternally threaded shaft, an internally threaded nut on the shaft movable axially on the threaded shaft upon rotation of the nut, the nut engaging and moving the second gear into engagement with the first gear, and means biasing the first and second gears out of engagement with one another, the activation of the linkage causing rotation of the nut thereby engaging the first and second gears.

29. A belt relaxer comprising a body a driving shaft rotatably carried by the body, a pressure roll on the driven shaft, a driven gear on the driven shaft, a driving shaft rotatably carried by the body, a driving gear on the driving shaft, spring means yieldably preventing rotation of the driving shaft, a sensor adapted to be positioned in a back rest portion of a seat, linkage linking the sensor and the driving shaft arranged to rotate the driving shaft in response to pressure against the sensor, said driven and driving shafts being spaced apart from one another to normally space the driven and driving gears apart, one of the driven and driving shafts movable toward the other to bring the driven and driving gears into engagement with one another, means yieldably urging the driven and driving shafts toward one another, means restraining such urging operable to release the driven shaft to such urging upon rotation of the driving shaft, a pressure plate arranged to engage one side of a belt, and the pressure roll on the driven shaft arranged to engage the other side of the belt upon engagement of the driving and driven gears thereby moving the belt upon rotation of the driven gear shaft.

30. The belt relaxer of claim 29 where, the driving gear has a recess portion out of engagement with the driven gear and arranged to move adjacent the driven gear upon predetermined travel of the driving gear thereby disengaging the driving and driven gears.

* * * * *